United States Patent
Riddle

(10) Patent No.: US 6,505,234 B1
(45) Date of Patent: *Jan. 7, 2003

(54) METHOD AND APPARATUS FOR LISTENING FOR INCOMING CALLS ON MULTIPLE PORT/SOCKET COMBINATIONS

(75) Inventor: Guy Riddle, Los Gatos, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/932,768

(22) Filed: Aug. 16, 2001

Related U.S. Application Data

(63) Continuation of application No. 08/646,911, filed on May 8, 1996, now Pat. No. 6,295,549.

(51) Int. Cl.$^7$ .............................................. G06F 15/16
(52) U.S. Cl. ...................................... 709/204; 709/227
(58) Field of Search ............................... 709/310–320, 709/204, 328–330

(56) References Cited

U.S. PATENT DOCUMENTS

| | | | | |
|---|---|---|---|---|
| 4,509,167 A | * | 4/1985 | Bantel et al. | 370/261 |
| 5,373,549 A | * | 12/1994 | Bales et al. | 379/93.21 |
| 5,490,247 A | * | 2/1996 | Tung et al. | 345/501 |
| 5,506,954 A | * | 4/1996 | Taymoor et al. | 345/501 |
| 5,524,110 A | * | 6/1996 | Gunner et al. | 709/204 |
| 5,526,037 A | * | 6/1996 | Cortjens et al. | 348/14.1 |
| 5,532,937 A | * | 7/1996 | Graziano et al. | 709/204 |

(List continued on next page.)

OTHER PUBLICATIONS

Handley et al., "The Conference Control Channel Protocol (CCCP): A scalable base for building conference control applications", University College London, ACM, pp. 275–287, 1995.*

Baker, Steven, "Remote–access protocols", UNIX Review, pp. (4), May 1995.*

(List continued on next page.)

*Primary Examiner*—St. John Courtenay, III
(74) *Attorney, Agent, or Firm*—Blakely, Sokoloff, Taylor & Zafman LLP

(57) ABSTRACT

In a computer system having a memory, a processor, and a network interface, a method for listening on multiple conferencing interfaces having the steps of loading a set of transport components into the memory; initializing each transport components of the set of transport components to listen on a particular conferencing interface using the network interface, each transport component of the set of transport components listening to a different conferencing interface; receiving an incoming call signal on the network interface having an incoming conferencing interface; processing the incoming call signal to detect the incoming conferencing interface; and launching an application based on the incoming conferencing interface.

An apparatus for listening on multiple conferencing interfaces having a set of transport components coupled to the network interface, each transport component of the set of transport components having the capability of receiving a signal on a different conferencing interface; a conference component coupled to each component in the set of transport components; a call processing module coupled to the conference component; and, a process manager coupled to the call processing module; the conference component containing a circuit for causing the call processing module to cause process manager to activate a conferencing application upon detecting a call from one transport component of the set of transport components.

12 Claims, 12 Drawing Sheets

U.S. PATENT DOCUMENTS

| | | | | |
|---|---|---|---|---|
| 5,574,934 A | * | 11/1996 | Mirashrafi et al. | 709/207 |
| 5,587,928 A | * | 12/1996 | Jones et al. | 709/204 |
| 5,617,539 A | * | 4/1997 | Ludwig et al. | 709/205 |
| 5,674,003 A | * | 10/1997 | Anderson et al. | 709/228 |
| 5,721,729 A | * | 2/1998 | Klingman | 370/251 |
| 5,742,670 A | * | 4/1998 | Bennett | 379/142.04 |
| 5,754,765 A | * | 5/1998 | Danneels et al. | 709/222 |
| 5,809,237 A | * | 9/1998 | Watts et al. | 709/204 |
| 5,841,976 A | * | 11/1998 | Tai et al. | 709/204 |
| 5,859,979 A | * | 1/1999 | Tung et al. | 709/228 |
| 5,887,170 A | * | 3/1999 | Ansberry et al. | 709/204 |

OTHER PUBLICATIONS

Burton, James, Standard Issue, Byte, pp(10), Sep. 1995.*

Wong, William, Welcome to Teleconferencing, Stacks, pp(7), Jun. 1995.*

Mello, John P. Jr., Telephony's Killer App?, Byte, pp(7), Sep. 1995.*

Kalman, Steve, CTI Systems: Now's the Time, Network VAR, pp(5), Aug. 1995.*

Finegan, James, "Building Windows NT–Based Client/Server Applications Using Remote Procedure Calls," Microsoft Systems Journal, pp(17), Oct. 1994.*

* cited by examiner

METHOD AND APPARATUS FOR LISTENING FOR INCOMING CALLS ON MULTIPLE PORT/SOCKET COMBINATIONS

The present application is a continuation of prior application No. 08/646,911, filed May 8, 1996 now U.S. Pat. No. 6,295,549 entitled Method and Apparatus For Listening For Incoming Calls On Multiple Port/Socket Combination.

BACKGROUND OF THE INVENTION

1. Field of the Invention

The present invention relates to the field of use of teleconferencing systems. More particularly, the present invention relates to the dynamic launching of teleconferencing applications upon receipt of a call.

2. Description of Related Art

Teleconferencing is increasingly becoming a popular application in personal computer systems. Such applications typically allow the transfer of audio and video data between users so that they can speak and otherwise communicate with one another. Such applications sometimes also include data sharing wherein various types of data such as documents, spreadsheets, graphic data, or other types of data, can be shared and manipulated by all participants in the teleconference. Different teleconference applications perhaps residing on different hardware platforms have different capabilities. Moreover, a wide variety of features has been implemented in different teleconference applications, and the proliferation of different types of computer systems with different capacities, and different networking media has created challenges for teleconferencing.

For example, most systems which are used for teleconferencing applications are also used to run such programs for performing work processing, spreadsheet applications, database applications, and a variety of other application. Thus, the resources contained in the computer system are shared between these multiple applications. Often, most computer systems are limited in the amount of random access memory they contain and also the amount of processing power available for performing operations. In order for a user to receive calls, the user must keep the conferencing application open. Otherwise, if the called party does not have the conferencing application open, the calling party would receive a notice that the called party is not present to answer the call.

So, in order to receive a call, a user currently needs to keep any conferencing application open. However, keeping the conferencing application open is a waste of resources. Memory which is allocated to the conferencing application could be used for other applications. Also, processing resources are consumed in launching and maintaining the conferencing application. These resources are unnecessarily preoccupied for the times when there are no teleconferencing sessions in occurrence. A user can wait until he wishes to initiate a teleconferencing session before launching the teleconferencing application, but this means that there is not call notification unless the user receives a "regular" phone call, which does not allow for on-demand conferencing.

Thus, a solution needs to be provided that will allow a system to dynamically load the conferencing application only when necessary to answer a call, but not require the conferencing application to be loaded and executing to receive notice of an incoming call.

In addition, a solution should be provided that will allow a conferencing application to wait on incoming calls on various ports simultaneously, thereby allowing a conferencing application which can handle conferencing over several different network/conferencing protocols and/or interfaces to achieve parallel conferencing capabilities (i.e., answering multiple calls, each coming in on a different network protocol or a different conferencing interface).

Moreover, a solution needs to be provided for multiple conferencing applications, each compatible with a different set of network/conferencing protocols, to be able to listen for incoming calls at the same time.

SUMMARY OF THE INVENTION

The invention provides a method and apparatus for listening on multiple network/conferencing protocols and/or interfaces. In addition, multiple persistent listening for multiple ports can exist for multiple conferencing applications (i.e., one persistent listen to one conferencing application) AND for a single conferencing application (i.e., multiple persistent listen to one conferencing application). Thus, for example a conferencing application can listen for incoming calls on both a TCP/IP port or an AppleTalk™ port.

The invention can be implemented in a computer system having a memory, a processor, and a network interface, a method for dynamically launching a conferencing application upon the receipt of an incoming call comprising the steps of loading a set of transport components into the memory; initializing each transport components of the set of transport components to listen on a particular conferencing interface using the network interface, each transport component of the set of transport components listening to a different conferencing interface; receiving an incoming call signal on the network interface having an incoming conferencing interface; processing the incoming call signal to detect the incoming conferencing interface; and launching an application based on the incoming conferencing interface.

An apparatus including a set of transport components coupled to the network interface, each transport component of the set of transport components having the capability of receiving a signal on a different conferencing interface; a conference component coupled to each component in the set of transport components; a call processing module coupled to the conference component; and, a process manager coupled to the call processing module; the conference component containing a circuit for causing the call processing module to cause process manager to activate a conferencing application upon detecting a call from one transport component of the set of transport components.

The invention will allow a system to dynamically load a conferencing application only when necessary to answer a call, but not require the conferencing application to be loaded and executing to receive notice of an incoming call. In addition, different conferencing applications can also be "dynamically" launched when incoming calls corresponding to each different conferencing applications arrive.

Other objects, features and advantages of the invention will be apparent from the accompanying drawings, and from the detailed description that follows below.

DETAILED DESCRIPTION OF THE INVENTION

The present invention provides a method and apparatus for dynamically launching teleconferencing applications upon receipt of a call. For purposes of explanation, specific embodiments are set forth to provide a thorough understanding of the present invention. However, it will be understood by one skilled in the art, from reading this disclosure, that the invention may be practiced without these details. Further, although the present invention is described through the use of certain specific embodiments thereof, especially, with relation to certain hardware configurations, data structures, packets, method steps, and other specific details, these should not be viewed as limiting one present invention. Various modifications can be made by one skilled in the art, without departing from the overall spirit and scope of the present invention.

A portion of the disclosure of this patent document contains material which is subject to copyright protection. They copyright owner has no objection to the facsimile reproduction by anyone of the patent disclosure, as it appears in the Patent and Trademark Office patent files or records, but otherwise reserves all copyright rights whatsoever. Copyright Apple Computer, Inc.

Figure 1:
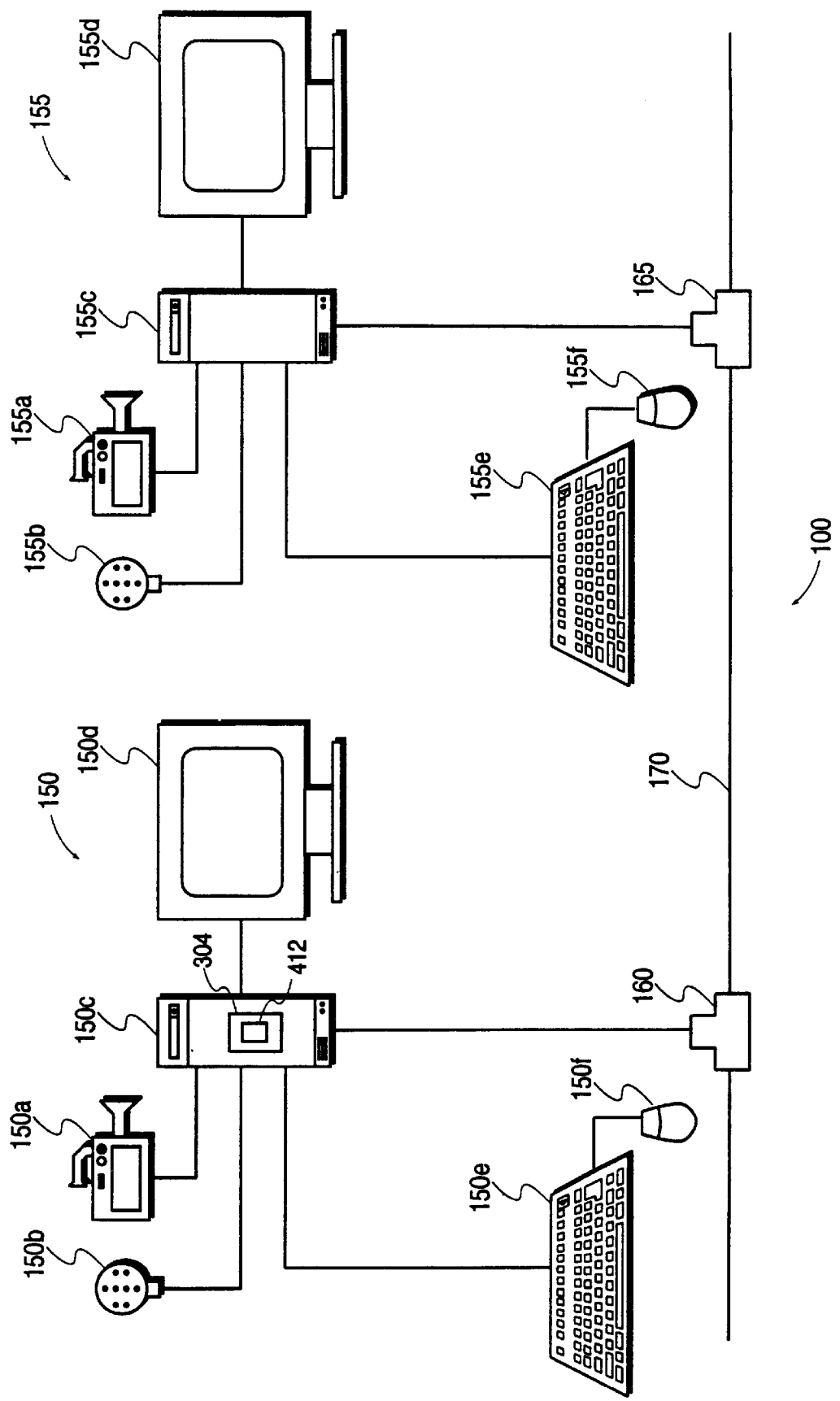
FIG. 1 illustrates an example configuration in which various embodiments of the invention may be implemented.

A typical system configuration in which a teleconference may take place is illustrated as 100 in FIG. 1. For example, a first workstation 150 may communicate via teleconference with a second workstation 155, as illustrated. System 150 may include a central processing unit 150c which is coupled to a display 150d a video input device 150a, and a sound input device 150b. The system 150 may communicate with over system 155 over networking medium 170 via network connection module 160. Network connection module 160 may include any number of network adapters commercially available such as Ethernet, Token Ring, or any other networking standard commercially available. Note that network adapter 160 may also include a wireless network adapter which allows transmission of data between components without a medium 170. Communication is thus provided via network adapter 165 coupled to system 155, and bi-directional communications may be established between two systems. System 150 further has a keyboard 150e and a pointing device 150f, such as a mouse, track ball, or other device for allowing user selections and user input.

In implemented embodiments of the present invention, a general purpose computer system is used for implementing the teleconferencing applications and associated processes to be described here. Although certain of the concepts to be described here will be discussed with reference to teleconferencing, it is apparent that the methods and associated apparatus can be implemented for other applications, such as file sharing, real time data acquisition, or other types of applications which sends data from a first participant to a second participant or set of participants. A computer system such as that used for implementing embodiments of the present invention will now be described.

Figure 2:
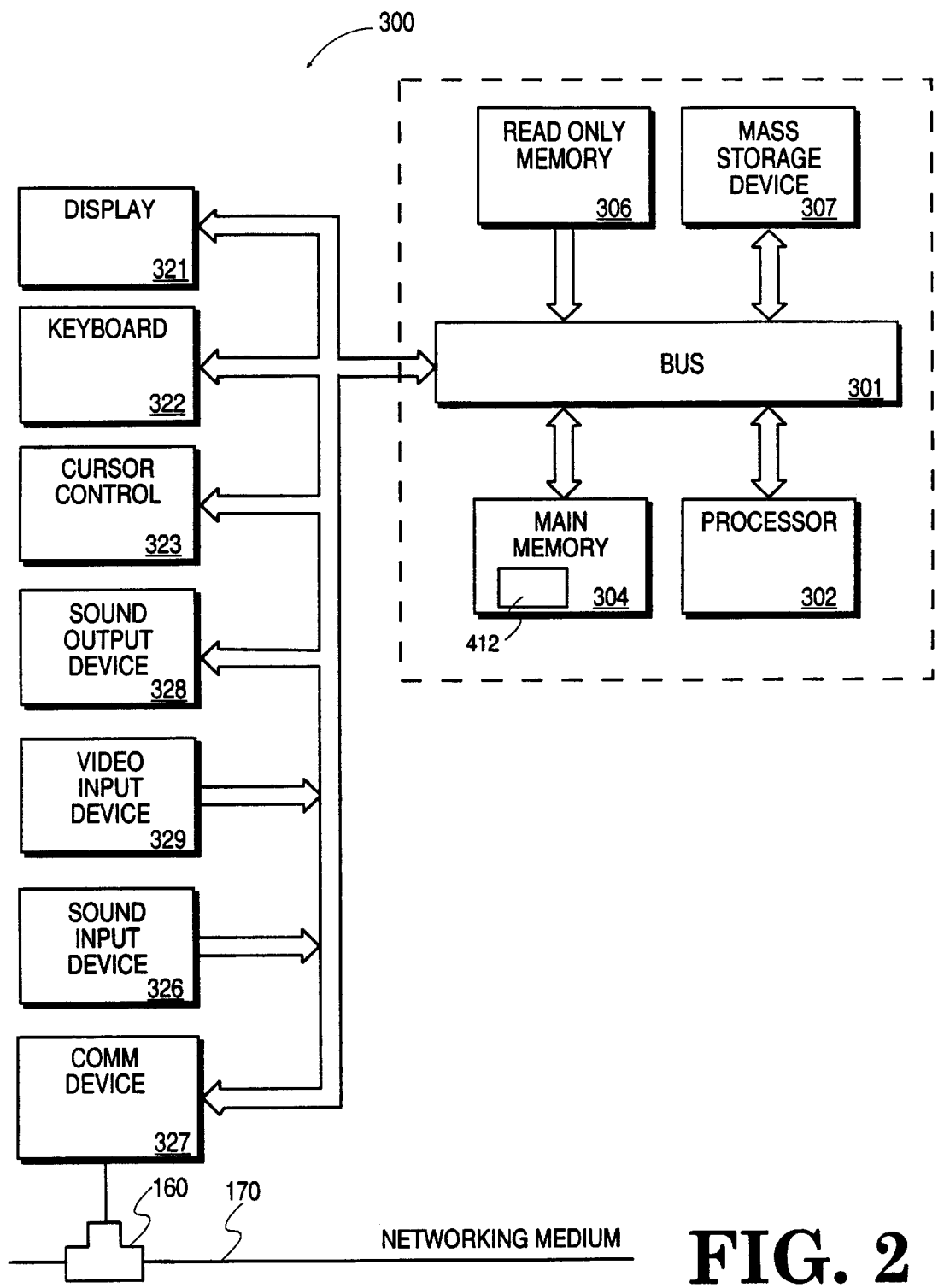
FIG. 2 illustrates a single system in which embodiments of the invention may be implemented.

FIG. 2 is a diagram showing a computer showing capable of implementing the present invention, such as a workstation, personal computer or other processing apparatus. The sub-system 300 comprises a bus or other communication means 301 for communicating information, and a processor 302 coupled with bus 301 for processing information. Sub-system 300 further comprises a random access memory (RAM) or other volatile storage device 304 (referred to as main memory), coupled to bus 301 for storing information and instructions to be executed by processor 302. Main memory 304 also may be used for storing temporary variables or other intermediate information during execution of instructions by processor 302. Sub-system 300 also comprises a read only memory (ROM) and/or other static storage device 306 coupled to bus 301 for storing static information and instructions for processor 302, and a mass storage device 307 such as a magnetic disk or optical disk and its corresponding disk drive. Mass storage device 307 is coupled to bus 301 for storing information and instructions.

Sub-system 300 may further be coupled to a display 321 such as a cathode ray tube (CRT) or liquid crystal display (LCD) coupled to bus 301 for displaying information to a computer user. Such a display 321 may further be coupled to bus 301 for the receipt of video or image information. A keyboard 322, including alphanumeric and other keys may also be coupled to bus 301 for communicating information and command selections to processor 302. An additional user input device is cursor control 323, such as a mouse, a trackball, stylus, or cursor direction keys, coupled to bus 301 for communicating direction information and command selections to processor 302, and for controlling cursor movement on display 321. For teleconferencing applications, system 300 may also have coupled to it a sound output device 328, a video input device 329, and sound input device 326, along with the associated D/A (Digital-to-Analog) and A/D (Analog-to-Digital) converters or software codecs for inputting or outputting media signal bitstreams. System 150c may further be coupled to communication device 327 which is coupled to network adapter 160 for communicating with other computers over network 370.

Note, also, that nay or all of the components of system 150c and associated hardware may be used in various embodiments, however, it can be appreciated that any configuration of the system may be used for various purposes according to the particular implementation.

In one embodiment, system 300 is one of the Apple Computer® brand family of personal computers such as the Macintosh 8100 brand personal computer manufactured by Apple Computer, Inc. of Cupertino, Calif. Processor 302 may be one of the PowerPC brand microprocessors manufactured by Motorola, Inc. of Schaumburg, Ill.

Although a general purpose computer system has been described, it can be appreciated by one skilled in the art, however, that the following methods and apparatus may be implemented in special purpose hardware devices, such as discrete logic devices, large scale integrated circuits (LSI's), application-specific integrated circuits (ASIC's), or other specialized hardware. The description here has equal application to apparatus having similar function.

Figure 3:
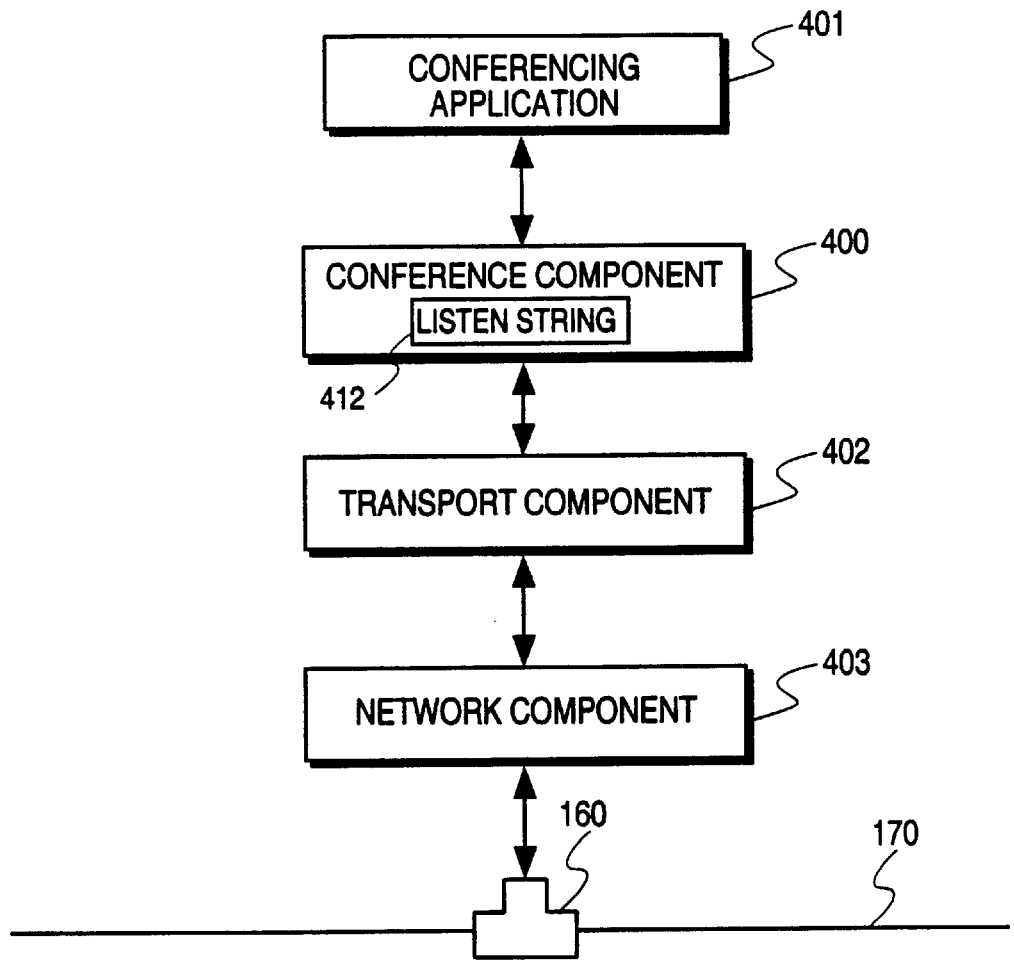
FIG. 3 illustrates an example architecture on which a system employing various embodiments of the invention is based.

FIG. 3 illustrates a plurality of processes and/or apparatus which may be operative within system 150c. At the highest level, for example, at the highest level in the ISO/OSI networking model, a conferencing application 401, such as a teleconferencing application, an audio/video server, or a data server, communicates with a conference component 400 in the form of Application Program Interface (API) calls.

Conference component 400 allows conferencing application 401 to establish communications between two or more teleconference stations. Control information, and media information can be transmitted between the first participant system and a second participant system. Conference component 400 communicates with the transport component 401 by sending messages for other teleconferencing stations which are encapsulated and placed into form that the transport component 402, and the network component 403, can packetize and transmit over networking medium 170.

Transport component 402 and networking component 403 provide the necessary operations for communication over the particular type of network adapter 160 and networking medium 170 according to a particular implementation. For example, networking component 403 may provide the TCP or ADSP protocols and packetizing, according to those respective standards. Transport component 402 can support standards such as H.320 or MovieTalk™ transport standards. There can exist multiple transport components and multiple network components, as described below.

The main function of conference component 400 is to establish and maintain a bi-directional connection between every member of a conference—i.e., between conferencing applications. Conferencing applications use a control channel to exchange control data that is pertinent to the conference. This data might include user identification information or other information that is germane to the application's operation. Conferencing applications (e.g., conferencing applications 401) define the format and content of these control messages by establishing their own control protocols within the boundaries of the conferencing API. Conferencing components further establish communication channels between a first endpoint and a second endpoint, using underlying transport component 402. Thus, once a media channel has been established, conference component 400 uses the media channel of transport component 402 which is provided for transmission of media and non-media information.

Conferencing application 401 controls conference component 400 by the issuance of QuickTime™ Conferencing API calls. Conferencing applications operate using an event-driven model wherein events pertinent to the application are issued to conferencing application 401. Conferencing application 401 can then take appropriate action either by modifying internal data structures within (creating a source or sync), and/or issuance of appropriate messages over the network to other connected components, or potential participants. In addition, conference components also respond to events and messages that are received. In addition, conference components take appropriate actions pertaining to the receipt of API calls from conferencing applications.

There can exist multiple conferencing components, wherein each conferencing application requires at least one conference component, but each conferencing application can have more than one associated conference component. Each conferencing component has an unique identification number. In addition, each conference component contains one "listen string", which is unique. A listen string is the encapsulation of the parameters of the "MTConferenceListen" API call for each conference component. Listen strings can contain more than one network or port. A listen string is composed of two parts: a fixed portion identifying a service name (which is similar to service names given to printers in an AppleTalk™ network that are displayed in the Chooser application in the Apple Macintosh operating system), and a variable portion containing a list of one or more service types, which contain the transport/network types with which the transport components and network components can interface. For example, service types can be port numbers for TCP/IP networks or device types for AppleTalk network. The transport/network tuples will be described below in association with the discussion of FIG. 5.

The system as shown in FIG. 3 requires that a conferencing application 401 be present to handle incoming call events generated by conference component 400. As conferencing applications (such as conferencing application 401) utilize significant system resources (e.g., processor processing power and memory space), the requirement that conferencing application 401 be executing even when there are not calls present to necessitate the existence of a conferencing application prevents the use of those resources by other applications. A system that removes the requirement by allowing conferencing application 401 to be launched when needed (i.e., launching only when there is an incoming call to handle), is described below.

Figure 5:
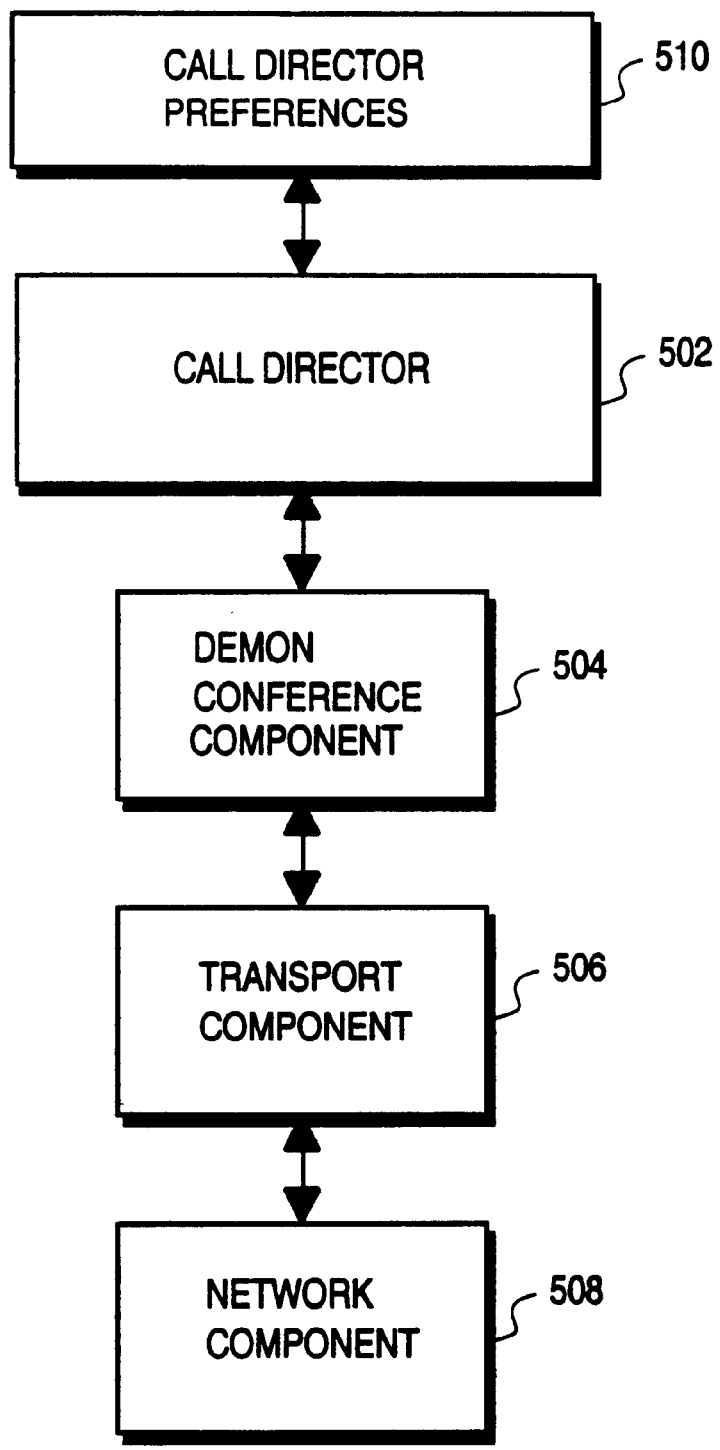
FIG. 5 illustrates a system employing various embodiments of the invention.

FIG. 5 illustrates a preferred embodiment of the invention having a call director 502; a demon conference component 504 (i.e., a conference component acting in demon mode); a transport component 506; and a network component 508. The preferred embodiment also contains a call director preferences 510. Call director 502, demon conference component 504, transport component 506, and network component 508 can be referred to as call processing module.

Call director 507 is a "faceless" background process that is loaded at initialization of the computer system contained in FIG. 2. One of the main functions of call director 502 is to initiate the automatic launching of a conferencing application when a call is received by the computer system. In addition, call director 502 is responsible for initiating and interacting with demon conference component 504 to control the transfer of calls to a conferencing application. As a faceless process—i.e., a process that does not need to contain any code to interface directly with a user–call director 502 requires very little in terms of system resources. More importantly, aside from the indications given by the dynamic launching capabilities and other functionality provided by call director 502, and the relatively small memory foot-print of call director 502, the user does not even have to be aware that call director 502 is existent. Through the use of the elements contained in FIG. 4, conferencing application 401 does not have to be loaded and executing until an incoming call exists.

Demon conference component 504, which is controlled by call director 502 through the use of the QuickTime™

Conferencing Application API, is responsible for performing the "persistent listening" for incoming calls. Demon conference component 504 is created by call director 504 after call director 504 has finished launching. Demon conference component 504 is an instance of the class of conference components that is initiated into a special mode of operation by call direction 504 through the use of a "MTConferenceSetPersistence" API call with the parameter "mtPersistentDemonMode".

In a preferred embodiment, there can only be one demon conference component in each computer system. Demon conference component 504 is the only conference component instance of call director 502. That is, call director 502 can only have a single instance of a conference component (as opposed to conferencing application, which can have multiple conference component instances). Demon conference component 504 communicates with other conference components to transfer incoming calls indicated by transport component 506 and network component 508 using a shared data structure in memory. A preferred embodiment of the shared data structure is further described below, along with a description of the basic operations of the invention, while referencing FIG. 6.

Figure 6:
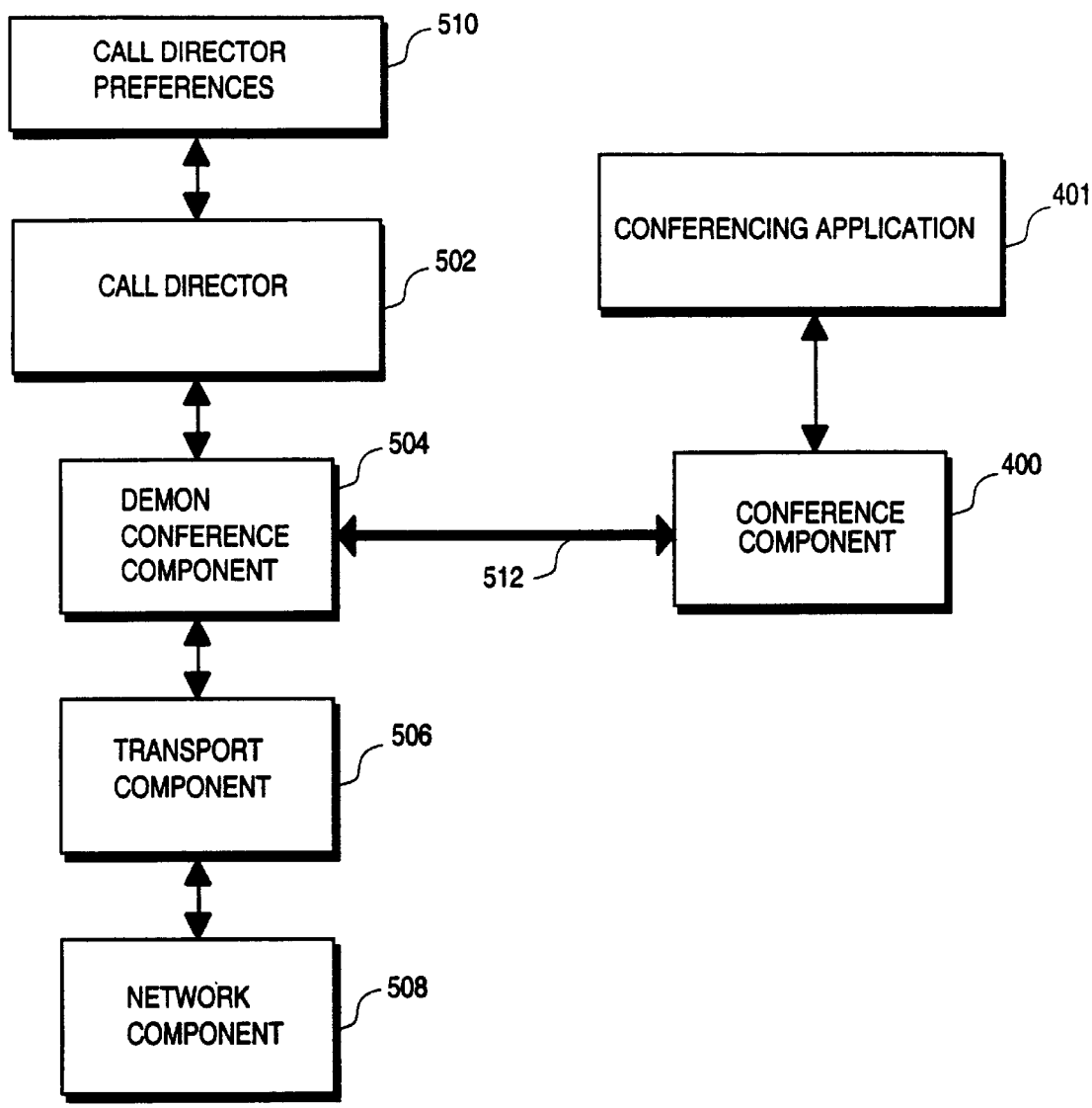
FIG. 6 illustrates a system employing various embodiments of the invention used for initializing persistent listening.

FIG. 6 illustrates a sample configuration using the preferred embodiment of the invention wherein conferencing application 401 and conference component 400 interacts with call director 502 and demon conference component 504 through the use of a shared queue structure 512.

Inter-Conference Component Communication

In the preferred embodiment, conference components communicate (i.e., achieve interprocess communication) through the use of shared memory. Specifically, conference components communicate through the use of globally accessible data structures composed of a demon queue and an application queue, both of which are contained in shared queue structure 512. The demon queue is used by any conferencing component of a conferencing application to send commands and information to demon conferencing component 504 ("QdPersistenceOn", "QdPersistenceOff", "QdListenAgain", "QdPersistence Clear"). The application queue is used by the demon conferencing component to send messages to other conferencing components ("QdListenerStatus", "QdDemonOff", "QdIncomingCall"). It is to be noted that the choice of using queues to allow inter-component communication is not intended to be limiting, and other methods of allowing inter-component communication can be used to achieve the same functionality. For example, instead of using queues to transfer commands and information, messages can be passed from one conferencing component to another. Alternatively, registers may be used to pass information from one conference component to another.

In the following description of FIG. 6, it is assumed that call director 502 has been loaded at the time of initilization of the computer system, and call director 502 has created an instance of the class of conference components and initialization into the conference component instance into demon conference component 504 through the use of the "MTConferenceSetPersistence" API call with a parameter of "mtPersistenceDemonMode". It is important that a demon conference component such as demon conference component 504 exists so as to perform persistent listening. If there is not a conference component in demon mode, there can be no persistent listening. Moreover, if a conferencing application tries to turn on persistent listening when there is no demon conference component initiated, the conference component of the conferencing application will return a "mtDemonKaputErr" message, indicating that there is no demon conference component to turn-on persistent listening.

Setting-Up Persistent Listening

As stated above, demon conference component 504 is responsible for listening for incoming calls on behalf of all conferencing applications for dynamically launching (if necessary) and transferring an incoming call to the conferencing application which requested persistent listening. The process for configuring demon conference component 504 and call director 502 in the preferred embodiment is as follows:

(1) conferencing application 401 will first send an "MTConferenceSetPersistence" API command with an "mtPersistenceOnMode" parameter after being launched to conference component 400;

(2) conference application 401 will then send an API command ("MTConferenceListen") requesting persistent listening and passing a listen string, which includes the identification of the port on which it wished demon conference component 504 to listen, to conferencing component 400;

(3) conference component 400 will place a request (QdPersistenceOn) on the demon queue to have demon conference component 504 perform persistent listening on the port specified by conferencing signature, as discussed below, identifying conferencing application 401 as the requester and the parameters, or so-called "listen string", of the listening that conferencing application 401 is requesting, the parameters including a service name and a port);

(4) demon conference component 504 will initialize transport component 506 and network component 508 as necessary to perform persistent listening on the requested service type and port;

(5) at substantially the same time as step (4), demon conference component 504 will also notify call director 502 through the use of a "mtPersistenceChangeEvent" that conferencing application 401 has requested persistent listening, and send the application signature of conferencing application 401 and the listen string, which, as stated, includes information regarding the service type and port on which conferencing application 401 wishes to listen;

(6) call director 502 will then store the information received from demon conference component 504, including the application signature of conferencing application 401 (call director 502 will create an alias, as described below, for conferencing application 401 from the application signature), the service name, the transport type, the network type, and the service type into call director preferences 510; and, (7) lastly, conferencing application 401 can either end execution or remain running—but under either case, the listening for incoming calls will be done by demon conference component 504, as described below.

Persistent Listening of Incoming Calls

During normal operations, demon conference component 504, after detecting an incoming call, will notify the conferencing application which requested the listening to transfer the incoming call. As mentioned above, in order to ensure that an incoming call can be matched-up with a conferencing application, call director 502 uses call director preferences 510 to track of the conferencing applications that requests persistent listening. Call director 502 also uses call director preferences 510 to track all listen strings of the various conference components corresponding to the various conferencing applications. Also as discussed above, each listen string corresponds to a particular conference component and contain the service and the ports for which that conference component is responsible. Thus, call director preferences 510 contains: (1) a list of aliases for conferencing applications that requested listening; and (2) what each conferencing applications want to listen on, such as the name of a user, the transport and the network type, and the service type (e.g., a port number for TCP/IP)).

Figure 4:
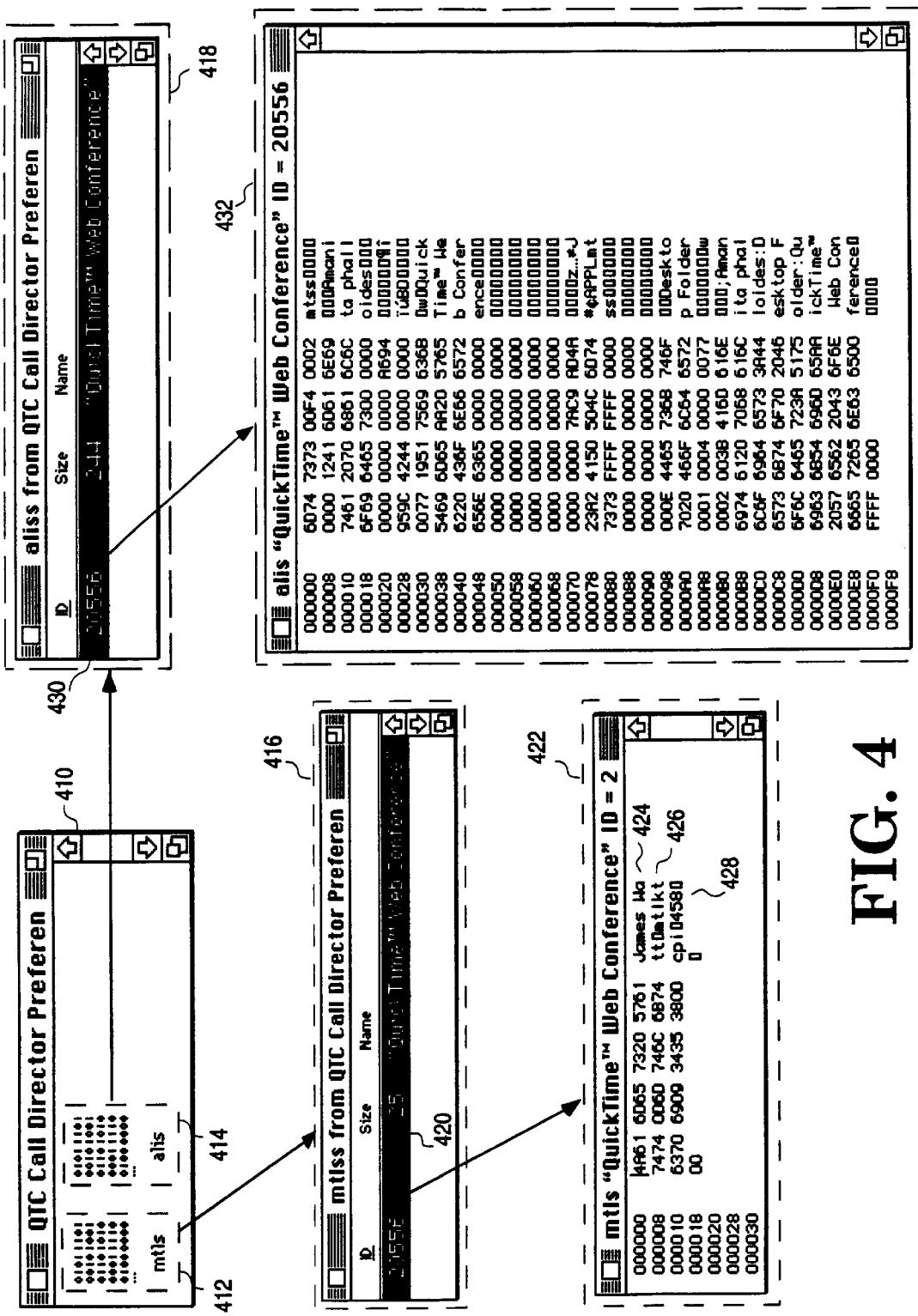
FIG. 4 illustrates a preference file configured in accordance to the invention.

FIG. 4 illustrates the contents of call director preferences 510, displayed in content window 410, containing logical representations of: a listen strings list 412 ("mtls"), and a conferencing application alias list 414 ("alis"). Call director 502 uses call director preferences 510 to keep track of the persistent listening requests of conferencing applications, and to hold the values used to initiate a demon conference components (e.g., demon conference component 504), any transport components (e.g., transport conference component 506), and any network components (e.g., network component 508). The contents of listen strings list 412 is displayed in a listen string list window 416. The contents of conferencing application alias list 414 is displayed in a alias list window 418.

As can be seen in listen string window 416, only one listen string, a listen string 420, is contained in listen strings list 412. Listen string 420 is identified in listen string list 412 by the unique identification number "20556", which is the identification number used to identify related resources in call director preferences 510. In addition, in listen string list window 416, it is shown that listen string 420 was initialized by conferencing application 401, which in this example is entitled "QuickTime™ Web Conference". Thus, listen string 420 identifies that conference component 400 belongs to conferencing application 401.

The contents of listen string 420 is displayed in a listen string content window 422. Listen string 420 contains a service name 424 ("James Watt" in ASCII and a hexadecimal equivalent), a transport type 426 ("mtlktcpi" in ASCII and a hexadecimal equivalent), and a port 428 ("458" in ASCII and a hexadecimal equivalent). Thus, conferencing component 401 is the requester of persistent listening for transport type 426 and port 428.

Referring still to FIG. 4, a conferencing application alias 430 is shown in conferencing application alias list 414 in alias list window 418. Conferencing application alias 422 has an identification number 20556, which is the same identification number used to identify listen string 420 in call director preferences 510. Conferencing application alias 422 is used by call director 502 to locate and launch conferencing application 401 (i.e., QuickTime™ Web Conference) when an incoming call matches the profile contained in listen string 420. The aliases contained in conferencing application alias list 414 is kept in call director preferences 510 and only used by call director 502—i.e. aliases are never passed down to demon conference component 504.

The contents of conferencing application alias 430 is shown in alias content window 432 and contains the location of conferencing application 401.

Answering of Incoming Calls After Persistent Listening Has Been Activated

Figure 7:
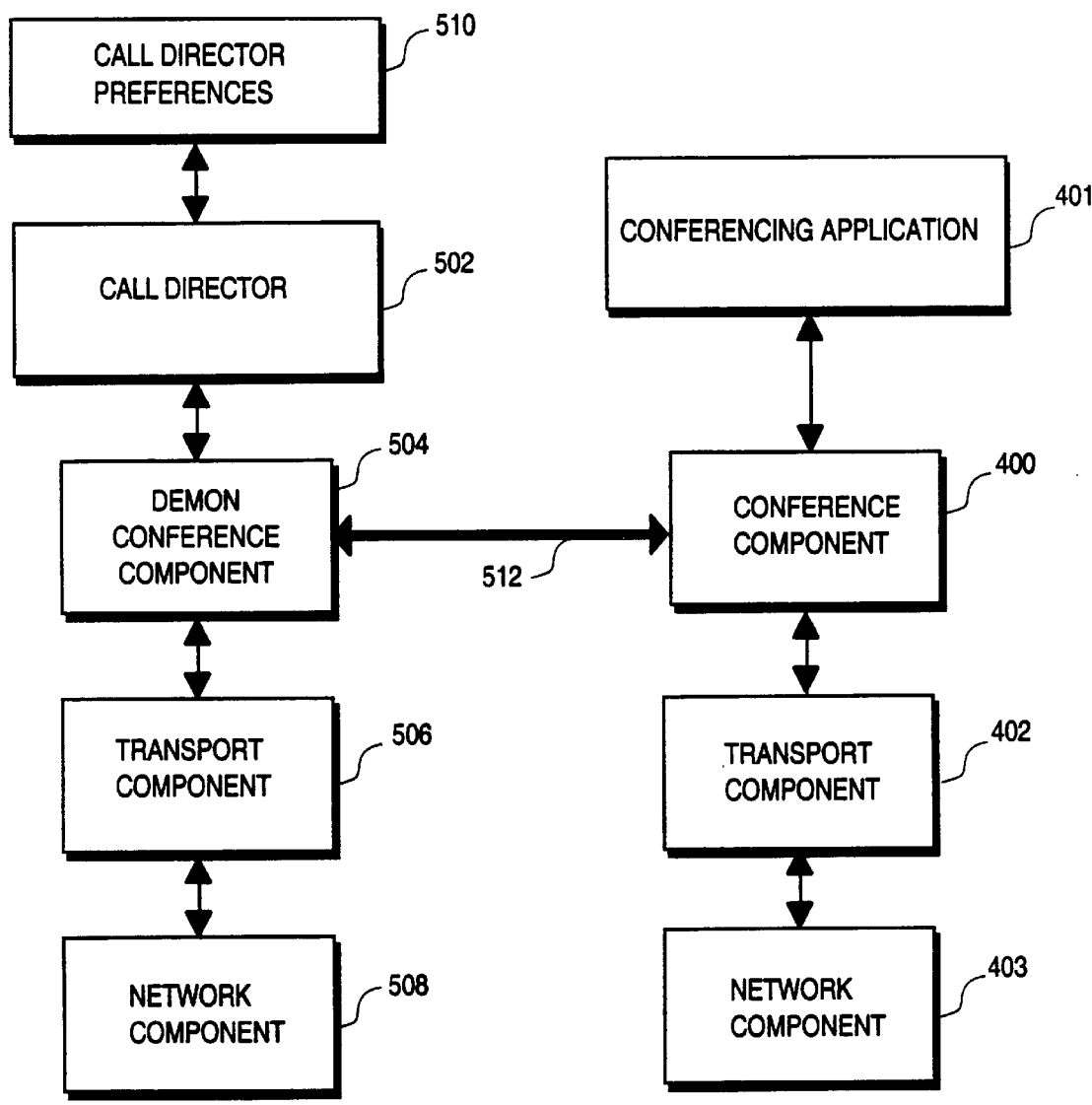
FIG. 7 illustrates a system employing various embodiments of the invention used for transferring an incoming call.

After persistent listening has been set-up, assuming that conferencing application is still running (see FIG. 6), when an incoming call is detected by transport component 506, demon conference component 504 will transfer the incoming call to conferencing component 400, which will notify conferencing application 401 of the incoming call. The incoming call is transferred through the following sequence:

(1) demon conference component 504 sends a "QdIncomingCall" message to conference component 400 through the use of shared queue structure 512;

(2) conference component 400 creates a new instance of a transport component and a new instance of a network component, which in FIG. 7 is transport component 402 and network component 403, respectively;

(3) demon conference component 504 sends conference component 400 a reference to transport component 506;

(4) conference component 400 "answers" the call by sending a "MTTransportAnswer" message, along with the reference to transport component 506, to transport component 402 instance to transfer the call from transport component 506;

(5) after the call has been transferred successfully, conference component 400 sends a "QdListenAgain" message to demon conference component 504 through the use of shared queue structure 512; and, (6) demon conference component 504 issues a "MTTransportListen" API call to transport component 506 to await the next incoming call.

System Re-Initialization After Persistent Listening Has Been Initialized

When the computer system is re-initialized and call director 502 is loaded and begins execution after system initialization, the following start-up sequence occurs:

(1) call director 502 reads call director preferences 510 and retrieves any listen strings;

(2) call director 502 initializes demon conference component 504 to place it into demon mode as described above;

(3) call director 502 sends one "MTConferenceDemonListen" API call to demon conference component 504 for each listen string that is retrieved from call director preferences 510, where each API call passes demon conference component 504 the retrieved listen string and the associated application signature for the conferencing application that requested the listening.

Hi-jacking of Listening

A later conferencing application will replace the listening of conferencing application 401 if the later conferencing application wants to listen to the same port (under TCP/IP) or the same name/device (under AppleTalk). If this occurs, a "mtListenHijackedErr", generated by demon conference component 504, will be received by conference component 400 if conferencing application 401, which has been "hijacked," is still running. Conference component 400 will then inform conferencing application 401 that the listening requested by conference component 401 has been taken over so that conferencing application 401 can take any necessary action.

In addition, demon conference component 504 will send a "MTConferenceSetPersistence" API call with the parameter of "mtPersistenceOffMode", along with the application signature of conferencing application 401, to call director 502. Call director 502 will then remove the listen strings for conferencing application 401 from call director preferences 510.

In conferencing application 401 is not running when a hi-jack occurs, then the "mtListenHijackedErr" will be removed after a certain time.

Turning Off Persistent Listening

If persistent listening is turned off for a listen string (i.e., a conference component), there will be no notification of incoming calls for that listen string if the conferencing applications that handles that listen string is not loaded and executing—i.e., the system will operate as it had before the existence of the invention. However, the user will continue to receive notification of incoming calls on the listen strings for which persistent listening has not been turned off.

The sequence to turn off persistent listening will depend on whether conferencing application 401 is loaded and executing. If conferencing application 401 is loaded and executing, then the sequence is as follows:

(1) conferencing application 401 sends conference component 400 a request to turn off persistent listening via a "MTConferenceSetPersistence" API call with "mtPersistenceOffMode" parameter;

(2) conference component 400 sends a "QdPersistenceOff" message to demon conference component 504;

(3) demon conference component 504 will then remove transport component 506 and network component 508 and send a "QdDemonOff" message to conference component 400;

(4) demon conference component 504 sends a "MtPersistenceChangedEvent" message to call director 502 with the application signature for conferencing application 401;

(5) call director 502 removes the listen string for conference component 400 from call director preference 510;

(6) conference component 400, after receiving the "QdPersistenceOff" message from demon conference component 504, will create a new instance of a transport component and a new instance of a network component and initialize them for local listening—i.e. conference component 400 will be responsible for waiting for an incoming call for the listen string.

If the user thereafter quits conferencing application 401, then the system will operate as if call director 502 is not present and the user will receive no notifications of incoming calls as conferencing application is not loaded and executed to perform listening.

It is to be noted that as a listen string can have more than one transport component and network component created for persistent listening—e.g., a listen string contains the listening for both a TCP/IP port and a AppleTalk service— demon conference component 504 will have to remove all the transport components and network components associated with the listen string for which persistent listening if turned off in step (3). In addition, when those instances of transport components and network components are removed, the conference component which requests that persistence listening be turned off for its listen string (e.g., conference component 400) will have to create a new set of transport component and network component instances to continue listening in step (6).

For a user to turn off persistent listening for the services and port that conferencing application 401 processes if conferencing application 401 is not currently loaded and executing, the user has to first launch conferencing application 401. Conferencing application 401 then reads its own preference files and performs listen with same values as it did the last time it executed (i.e., conference component 400 sends a listen request with the same listen string it sent to initiate persistent listening to demon conference component 504). Then, the same sequence used to turn off persistent listening is used, as described above.

Dynamic Launching of a Conferencing Application

Figure 8:
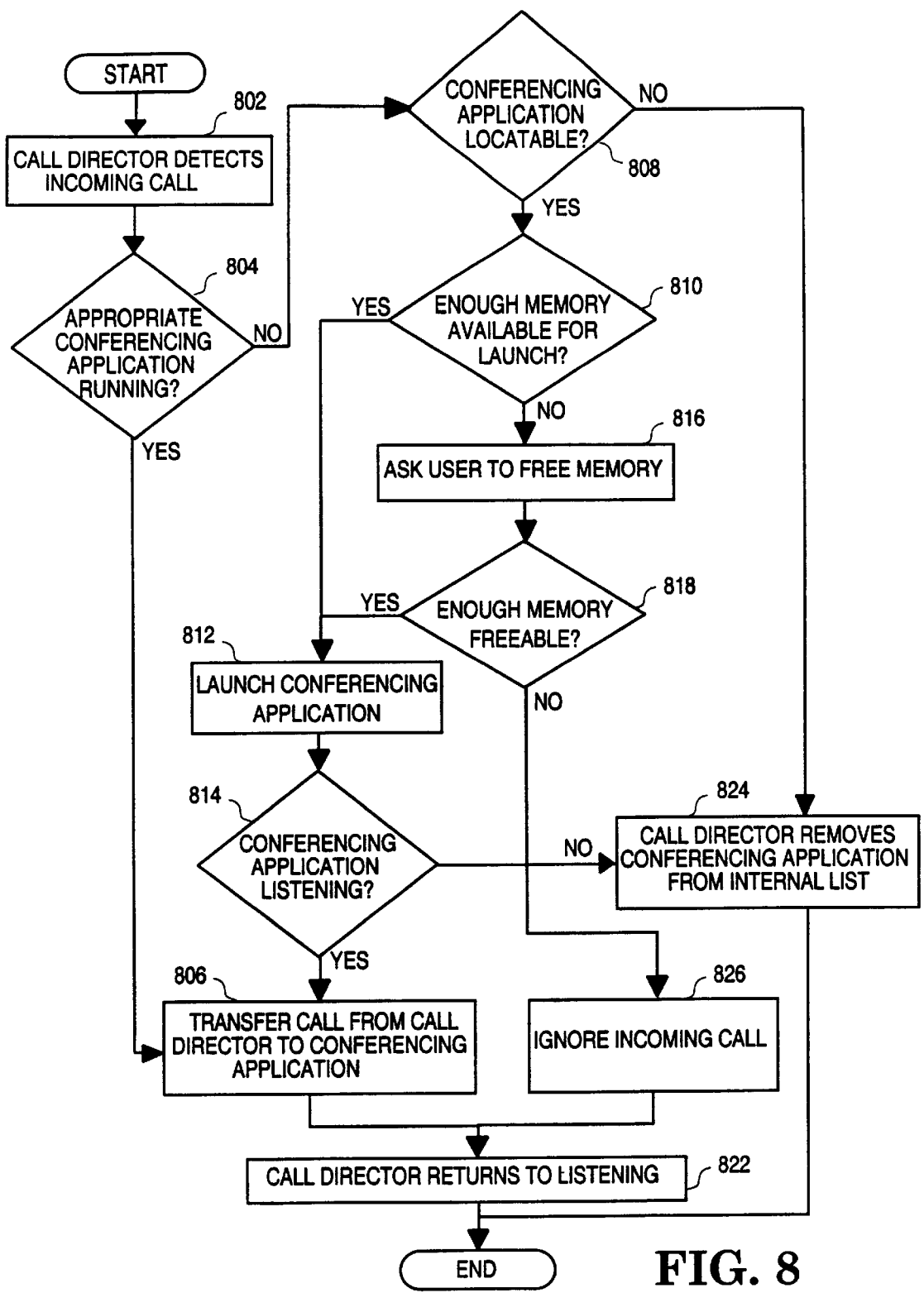
FIG. 8 is a flow diagram illustrating a preferred operation of the invention used for dynamically launching a conferencing application.

FIG. 8 is a flow diagram of the preferred operation of the invention wherein call director 502 operates to dynamically launch of conferencing application after persistent listening has been initialized and an incoming call is received. The system in operation at the start of the flow diagram is as shown in FIG. 5.

In block 802, call director 502 detects an incoming call through the use of demon conference component 504 and transport component 506. Call director 502 is notified by an "mtIncomingCallForEvent", containing an application signature of the conferencing application which set-up the listen string.

In block 804, demon conferencing component 504 will place a "QdIncomingCall" message on the application queue with the application signature, listen string, identity of transport component 506 (i.e., a reference to transport component 506), and an "MtAddress" parameter, which identifies the address of the caller. Demon conference component 504 will also send an "MTIncomingCallForEvent" to call director 502 that an incoming call has been received along with an application signature and listen string for conferencing application 401 and conference component 400. Call director 502 then checks the current process list to see if the conferencing application with the target application signature (i.e., conferencing application 401) is a process that is currently running. Operation will then continue with block 806, as discussed below. If the conferencing application is not running, call director 502 will try to launch the conferencing application, as discussed in block 808.

In block 808, where the conferencing application is not currently executing, call director 502 will determine if the conferencing application is locatable so that it can be launched—i.e., whether the location of the conferencing application can be ascertained. Call director 502 will retrieve conferencing application alias 422 for conferencing application 401 from call director preferences 510, update the location of conferencing application 401 if necessary, and then use the process manager to launch conferencing application 401. If a conferencing application corresponding to conferencing application alias 422 cannot be found (e.g., where conferencing application 401 has been removed from the storage devices accessible to the computer system), then operations will continue with block 824.

In block 810, if conferencing application is locatable, call director 502 will determine whether there is enough free memory to run the conferencing application. If there is enough memory for conferencing application 401 to execute call director 502 will then initiate the launching of conferencing application 401 continuing with block 812.

If there does not exist enough memory for the conferencing application to execute, operations will continue with block 816, where the user will be notified through an alert dialog that conferencing application 401 does not have enough memory to launch, and unless the user terminates and quits one or more processes that are currently occupying memory, the user will not be able to accept the incoming call. Call director 502 will keep checking for the user to free up memory until a predetermined time-out period has elapsed in block 818. At the end of the time-out period, if the user has not freed-up enough memory, operation will continue with block 826. If the user does free up enough memory, the operations will continue with block 812.

In block 812, where there exists enough memory for conferencing application 401 to begin execution, call director 502 will launch conferencing application 401 by using the process manager. Conferencing application 401 is notified that it must process the incoming call and therefore launches.

After conferencing application 401 has launched, the system configuration will be as shown in FIG. 6, where conferencing application 401 and its associated conference component 400 has loaded and is executing.

In block 814, call director 502 checks to see if conferencing application 401 is listening in the same way as it was when the conferencing application set-up call director 502 for persistent listening. If conferencing application 401 does not listen in the same way within a reasonable time, demon conference component 504 recognizes that the incoming call has not been handled (i.e., the incoming call event has not been removed from the application queue) and will inform call director 502 with a "mtPersistenceChangedEvent" with the "mtPersistenceOffMode" parameter and the application signature of conferencing application 401. Call director 502 will then remove the entry for conferencing application 401 from call director preference file 510 in block 824, as described below. If conferencing application 401 is listening in the same way, then conferencing application 401 is transferred the incoming call as in block 806.

In block 806, and referring to FIG. 7, after the conferencing application has completed launching, or if the conferencing application is already executed, call director 502 will transfer the incoming call to the conferencing application, as described above, and return to listening, as discussed in block 822, below.

After conferencing application 401 has been transferred the call, conferencing application 401 will then be responsible for giving the user an option to accept the call. If the user decides to accept the call, then conferencing application 401 will perform as usual an process the incoming call. If the user does not accept the call, then operation will continue with block 820. It is to be noted that whether or not the user decides to accept the call, call director 502 is not affected after call director 502 has transferred the incoming call to conferencing application 401 and returns to listening, as discussed in block 822.

In block 822, after either: (1) call director 502 has transferred the incoming call to the conferencing application as in block 806; or (2) demon conference component 504 has dropped the call—i.e. removed the call from the incoming call event queue—as in block 826, demon conference component 504 will return to listening.

In block 824, where conferencing application 401 is not locatable or conferencing application 401 is not listening using the same values with which conferencing application 401 set-up call director 502, call director 502 will remove all references to conferencing application 401 from call director preferences 510.

In block 826, if there is not enough memory available to launch conferencing application 401 and the user does not free-up any memory within the time-out period in block 816, then the incoming call will not be answered and the caller will receive a notice that the user the caller is trying to contact is not available. The incoming call will also be dropped if conferencing application 401 is not listening in the same way as it was when conferencing application 401 set-up call director 502 to listen for incoming calls. If there is not enough memory available to launch conferencing application 401 and the user does not free-up any memory within the time-out period in block 816, then the system will be the one shown in FIG. 5, where conferencing application 401 and conference component 400 are not executing. If conferencing application 401 is not listening in the same way as it was when conferencing application 401 set-up call director 502 to listen for incoming calls, then the system will be as shown in FIG. 6, where conferencing application 401 and conference component 400 are executing even though they are not processing any incoming calls.

Listening on Multiple Ports By Multiple Conferencing Applications

Figure 9:
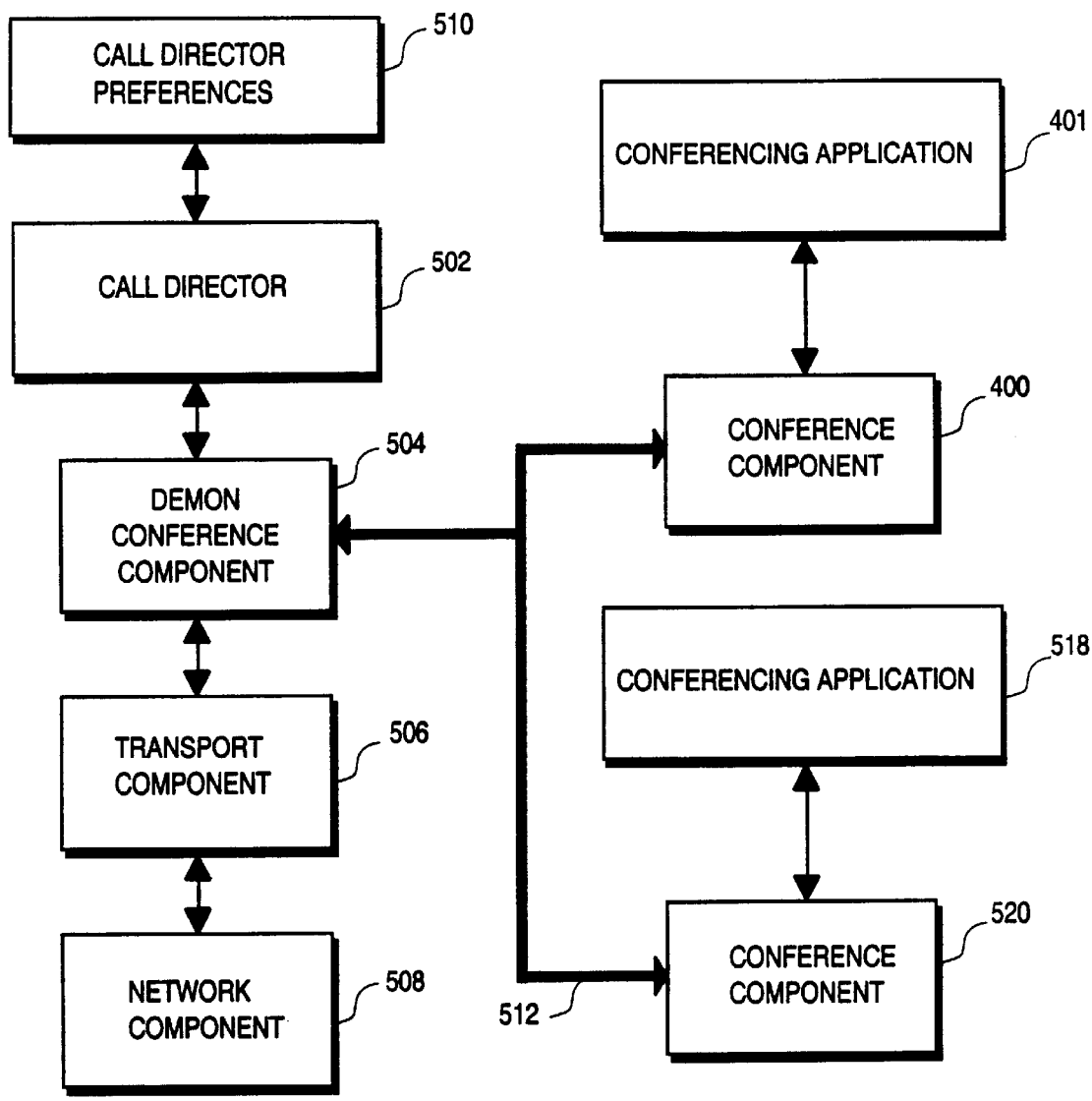
FIG. 9 illustrates a system employing various embodiments of the invention used for initializing a second persistent listening.

FIG. 9 illustrates a preferred embodiment of the invention for initiating persistent listening on multiple ports where the system of FIG. 6 (wherein conferencing application 401 and conference component 400 has set-up persistent listening, as discussed above) now includes a second conferencing application 518 and a second conference component 520. Second conferencing application 518 and second conference component 520 is launched and initiated the same way as conferencing application 401 and conference component 400.

It will be recalled that in the discussion of FIG. 6, transport component 506 and network component 508 have been initialized to listen for an incoming call matching the parameters of the listen string belonging to conferencing application 401. Now, in FIG. 9, second conferencing application 518 wishes to set-up persistent listening under a different set of parameters (e.g. under AppleTalk, versus TCP/IP for conferencing application 401). The sequence followed by second conferencing application 518 is identical to the sequence performed by conferencing application 401, except for the different value of the listen string passed to demon conference component 504 and call director 502 to set-up a different transport component and a different network component.

In FIG. 9, before second conferencing application 518 has requested and set-up persistent listening, there is only persistent listening being performed for conferencing application 401. After second conferencing application 518 has set-up persistent listening, the system will be as shown in FIG. 10.

Figure 10:
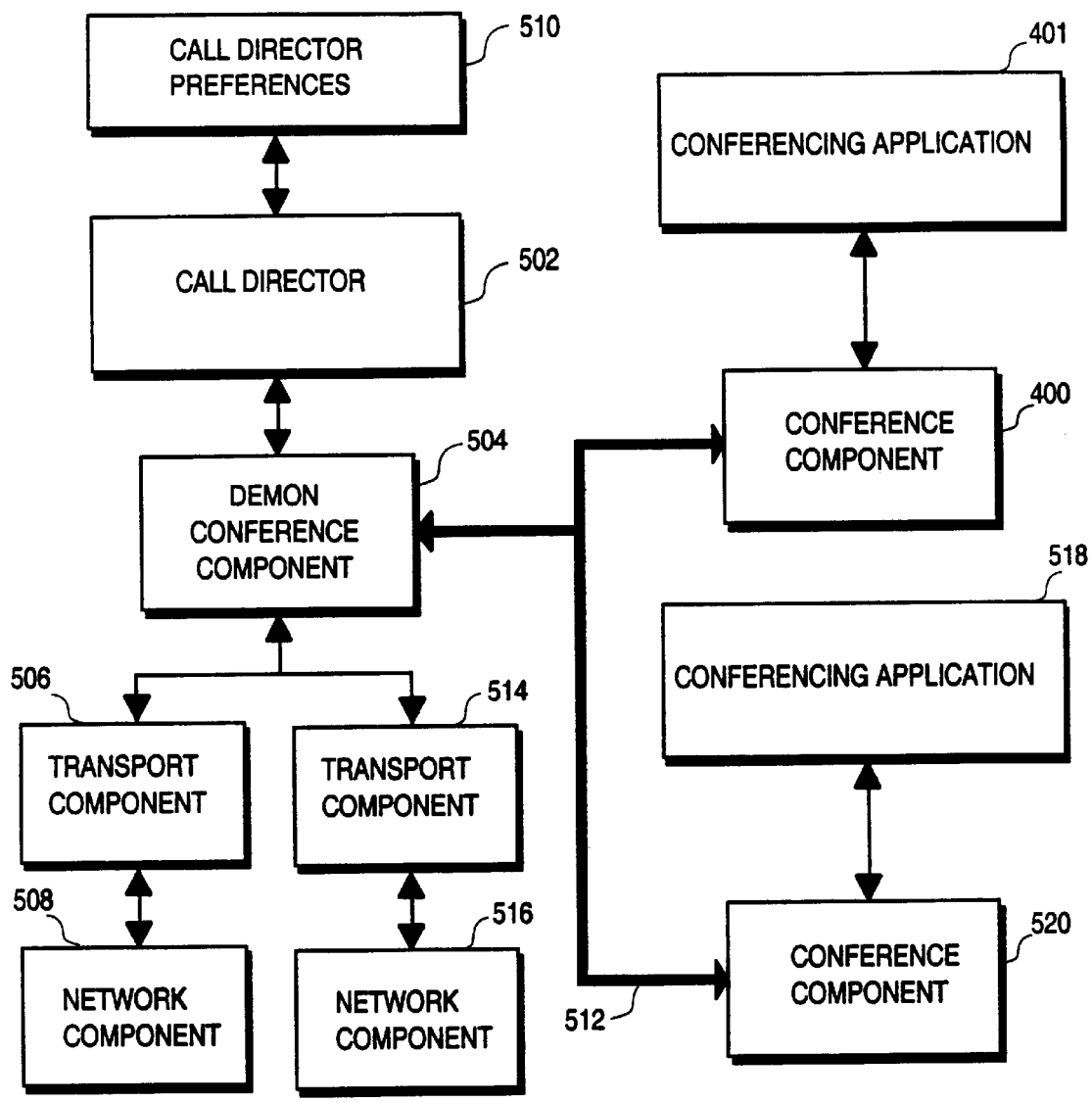
FIG. 10 illustrates a system employing various embodiments of the invention used for maintaining a second persistent listening on a second port.

In FIG. 10, after second conferencing application 518 has set-up persistent listening, a second transport component 514 instance and a second network component 516 instance has been created to perform the listening requested by second conferencing application 518. Second transport component 514 and second network component 516 are identical to transport component 506 and network component 508, except that they are set-up to listen for incoming calls having the parameters of the listen string of second conference component 520.

Figure 11:
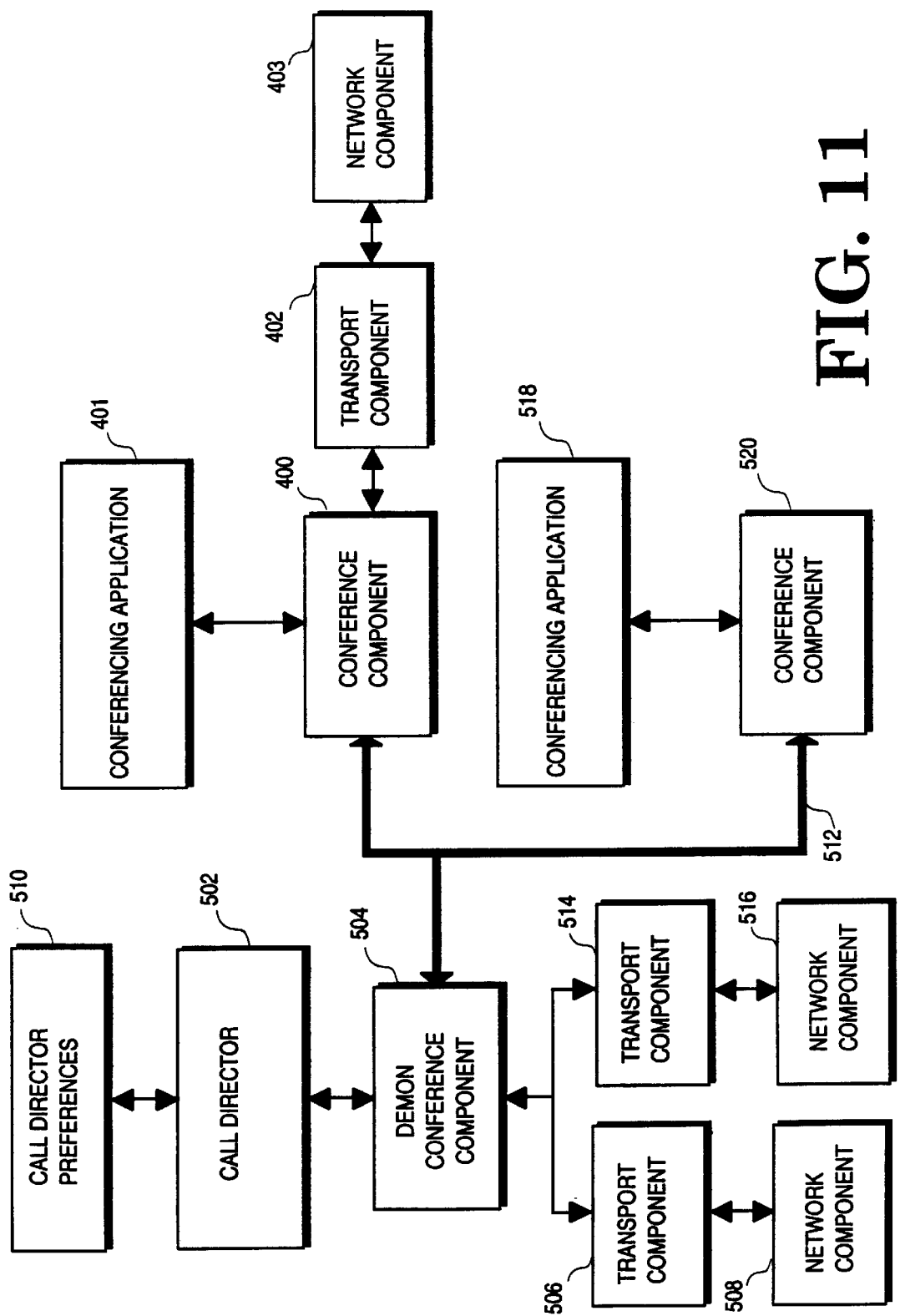
FIG. 11 illustrates a system employing various embodiments of the invention used for receiving an incoming call on a first port.

In FIG. 11, an incoming call has come in matching the parameters of the listen string for conference component 400 and demon conference component has transferred the incoming call to conferencing 401, as discussed above.

Figure 12:
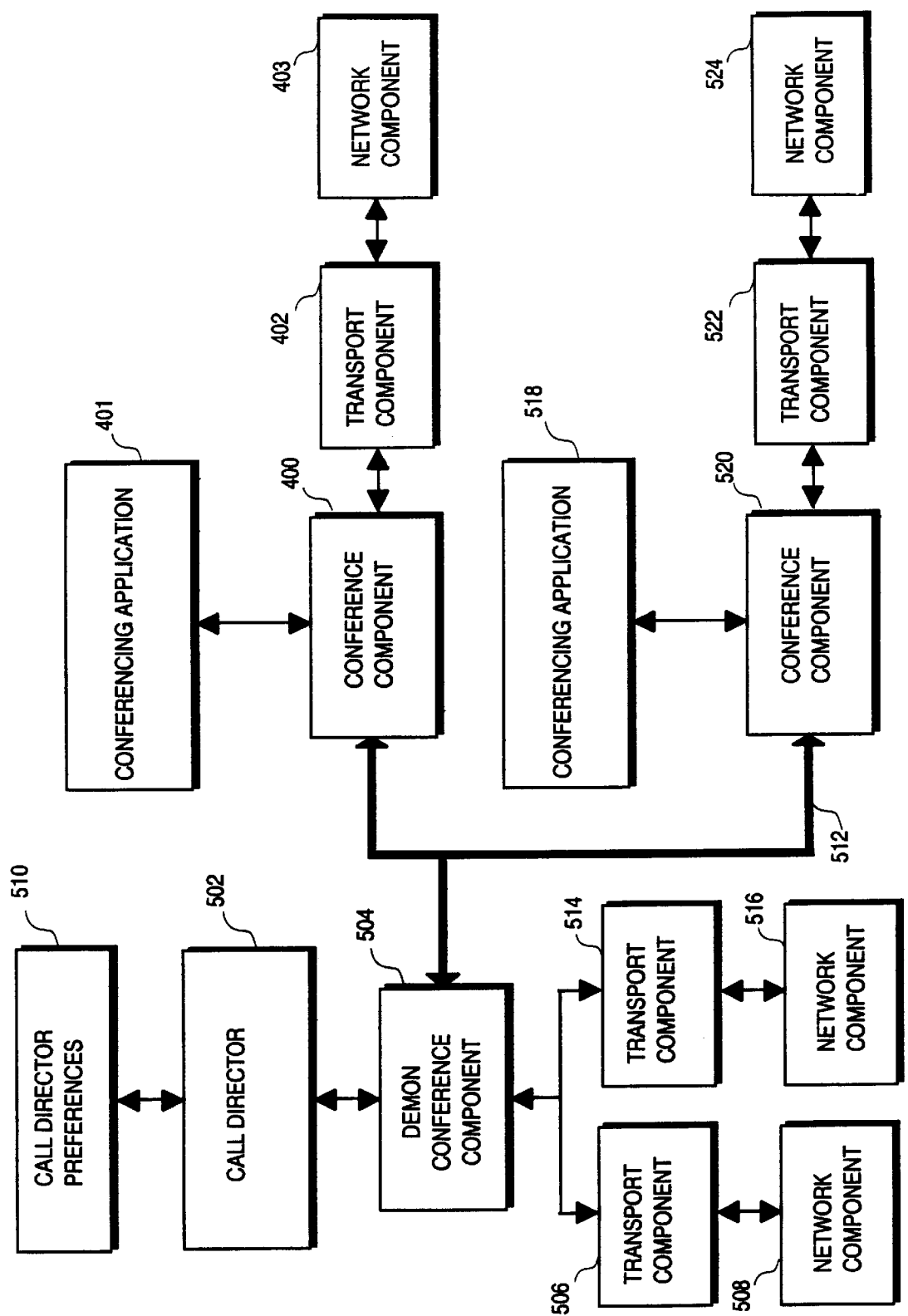
FIG. 12 illustrates a system employing various embodiments of the invention used for receiving an incoming call on the second port while a call is received on a first port.

In FIG. 12, while conferencing application 410 is processing the incoming call received in FIG. 11, an incoming call has come in for second conferencing application 518 and has been transferred to second conferencing application 518 through the creation of a third transport component 522 and a third network component 524 to Thus, the explanation give above in FIGS. 5–8 can be modified by substituting second conferencing application 518, second conference component 520, third transport component 522, third network component 524, second transport component 514 and second network component 516 for conferencing application 401, conference component 400, transport component 402, network component 403, transport component 506 and network component 508, respectively, with the exception that there would now be a different listen string for second conference component 520. In addition, listen strings list 412 and conferencing application alias list 414 in FIG. 4 would contain an additional listen string for second conference component 518 and an additional alias for second conferencing application 520, respectively. For example, if second conferencing application 518 is not loaded when an incoming call matching the parameters of the listening requested by second conferencing application 518 came in, then second conferencing application 518 and second conference component 520 would be dynamically launched to handle the incoming call as discussed in FIG. 8.

It is to be noted that not only can persistent listening for multiple ports can exist for multiple conferencing applications, multiple persistent listening can exist for a single conferencing application if there is more than one service in the listen string of the conference component of that conferencing application, as mentioned above.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. A method comprising:
    loading a set of transport components into a memory;
    initializing each transport component of the set of transport components to listen on a particular conferencing interface using a listen string to associate with a network interface, each transport component of the set of transport components listening to a different conferencing interface, the listen string encapsulating parameters to one or more calls to listen;
    receiving an incoming call signal on the network interface having an incoming conferencing interface;
    processing the incoming call signal to detect the incoming conferencing interface; and
    launching an application based on the incoming conferencing interface.

2. The method of claim 1, further comprising:
    receiving an initialization message from the application; and
    removing the application from a list if the initialization message does not correspond to an expected message.

3. The method of claim 1, wherein processing the incoming call signal comprises:
    receiving a signal from a responding transport component in the set of transport components;
    determining an identification of the responding transport component; and
    deriving the incoming conferencing interface using the identification of the responding transport component.

4. The method of claim 1, wherein the launching the application comprises:
    determining an application signature for the application based on the incoming conferencing interface;
    locating the application using the application signature; and
    signaling a process manager to launch the application.

5. The method of claim 1, wherein the conferencing interface comprises a transport control protocol/internet protocol port.

6. The method of claim 1, wherein the conferencing interface comprises a communication port.

7. A computer readable storage medium containing executable computer program instructions which when executed by a digital processing system cause the system to perform a method comprising:
    loading a set of transport components into a memory;
    initializing each transport component of the set of transport components to listen on a particular conferencing interface using a listen string to associate with a network interface, each transport component of the set of transport components listening to a different conferencing interface, the listen string encapsulating parameters to one or more calls to listen;
    receiving an incoming call signal on the network interface having an incoming conferencing interface;
    processing the incoming call signal on a processor to detect the incoming conferencing interface; and
    launching an application based on the incoming conferencing interface.

8. The computer readable storage medium of claim 7 wherein the program instructions further cause the system to perform the method further comprising
    receiving an initialization message from the application; and
    removing the application from a list if the initialization message does not correspond to an expected message.

9. The computer readable storage medium of claim 7, wherein processing the incoming call comprises:
    receiving a signal from a responding transport component in the set of transport components;
    determining an identification of the responding transport component; and
    deriving the incoming conferencing interface using the identification of the responding transport component.

10. The computer readable storage medium of claim 7, wherein launching the application comprises:
    determining an application signature for the application based on the incoming conferencing interface;
    locating the application using the application signature; and
    signaling a process manager to launch the application.

11. The computer readable storage medium of claim 7, wherein the conferencing interface comprises a transport control protocol/internet protocol port.

12. The computer readable storage medium of claim 7, wherein the conferencing interface comprises a communication port.

* * * * *

UNITED STATES PATENT AND TRADEMARK OFFICE
CERTIFICATE OF CORRECTION

PATENT NO. : 6,505,234 B1
DATED : January 7, 2003
INVENTOR(S) : Riddle

It is certified that error appears in the above-identified patent and that said Letters Patent is hereby corrected as shown below:

<u>Title page,</u>
Item [57], ABSTRACT, please delete

In a computer system having a memory, a processor, and a network interface, a method for listening on multiple conferencing interfaces having the steps of loading a set of transport components into the memory; initializing each transport components of the set of transport components to listen on a particular conferencing interface using the network interface, each transport component of the set of transport components listening to a different conferencing interface; receiving an incoming call signal on the network interface having an incoming conferencing interface; processing the incoming call signal to detect the incoming conferencing interface; and launching an application based on the incoming conferencing interface.

An apparatus for listening on multiple conferencing interfaces having a set of transport components coupled to the network interface, each transport component of the set of transport components having the capability of receiving a signal on a different conferencing interface; a conference component coupled to each component in the set of transport components; a call processing module coupled to the conference component; and, a process manager coupled to the call processing module; the conference component containing a circuit for causing the call processing module to cause process manager to activate a conferencing application upon detecting a call from one transport component of the set of transport components.

UNITED STATES PATENT AND TRADEMARK OFFICE
CERTIFICATE OF CORRECTION

PATENT NO. : 6,505,234 B1
DATED : January 7, 2003
INVENTOR(S) : Riddle

It is certified that error appears in the above-identified patent and that said Letters Patent is hereby corrected as shown below:

Title page (cont'd),
and insert

In one embodiment, the invention provides a method comprising loading a set of transport components into a memory; initializing each transport component of the set of transport components to listen on a particular conferencing interface using a listen string to associate with a network interface, each transport component of the set of transport components listening to a different conferencing interface, the listen string encapsulating parameters to one or more calls to listen; receiving an incoming call signal on the network interface having an incoming conferencing interface; processing the incoming call signal to detect the incoming conferencing interface; and launching an application based on the incoming conferencing interface. Other embodiments of the invention are also described.

Signed and Sealed this

Ninth Day of August, 2005

JON W. DUDAS
*Director of the United States Patent and Trademark Office*